US010678778B1

(12) United States Patent
Chalmer et al.

(10) Patent No.: US 10,678,778 B1
(45) Date of Patent: Jun. 9, 2020

(54) DATE DEDUPLICATION ACCELERATION

(71) Applicant: EMC IP Holding Company LLC, Hopkinton, MA (US)

(72) Inventors: Steven Chalmer, Redwood City, CA (US); Jonathan Krasner, Coventry, RI (US); Chakib Ouarraoui, Watertown, MA (US); Serge J. Pirotte, Coventry, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 303 days.

(21) Appl. No.: 15/787,930

(22) Filed: Oct. 19, 2017

(51) Int. Cl.
  *G06F 16/00* (2019.01)
  *G06F 16/23* (2019.01)
  *G06F 16/9535* (2019.01)

(52) U.S. Cl.
  CPC ...... *G06F 16/2365* (2019.01); *G06F 16/9535* (2019.01)

(58) Field of Classification Search
  CPC ............... G06F 16/1748; G06F 16/137; G06F 11/1453; G06F 3/0641; G06F 3/0644
  See application file for complete search history.

(56) References Cited

U.S. PATENT DOCUMENTS

| | | | | |
|---|---|---|---|---|
| 8,528,085 | B1 * | 9/2013 | Juels | G06F 16/13 726/22 |
| 8,898,121 | B2 * | 11/2014 | Amit | G06F 11/1453 707/692 |
| 9,311,323 | B2 * | 4/2016 | Chakraborty | G06F 3/0608 |
| 10,373,247 | B2 * | 8/2019 | Vermeulen | G06Q 40/00 |
| 10,374,807 | B2 * | 8/2019 | Chen | G06F 11/1453 |
| 10,496,626 | B2 * | 12/2019 | Friedman | G06F 3/0641 |
| 2011/0307447 | A1 * | 12/2011 | Sabaa | H04L 67/2842 707/637 |
| 2011/0307659 | A1 * | 12/2011 | Hans | G06F 3/0613 711/114 |
| 2013/0318051 | A1 * | 11/2013 | Kumar | G06F 16/1748 707/692 |
| 2017/0131934 | A1 * | 5/2017 | Kaczmarczyk | G06F 3/0644 |
| 2017/0315875 | A1 * | 11/2017 | Tirupati Nagaraj | G06F 11/1453 |
| 2019/0205244 | A1 * | 7/2019 | Smith | G06F 3/0613 |

\* cited by examiner

*Primary Examiner* — Merilyn P Nguyen
(74) *Attorney, Agent, or Firm* — Muirhead and Saturnelli, LLC

(57) ABSTRACT

Techniques for data deduplication may include: receiving write operations that write first data; partitioning the first data into a plurality of data portions; generating, using a first hash function, a plurality of data deduplication hash values for the plurality of data portions, wherein a first data deduplication hash value of the plurality of data deduplication hash values is produced by said generating for a first of the plurality of data portions; performing first processing using a Bloom filter to determine whether the first data deduplication hash value has a corresponding first entry in a data store of deduplication hash values; and responsive to the first processing determining the first data deduplication hash value does not have the corresponding first entry in the data store of deduplication hash values, performing second processing, said second processing including adding the corresponding first entry in the data store of deduplication hash values.

18 Claims, 11 Drawing Sheets

DATE DEDUPLICATION ACCELERATION

BACKGROUND

Technical Field

This application generally relates to data storage and more particularly to techniques used in connection with data deduplication.

Description of Related Art

Computer systems may include different resources used by one or more host processors. Resources and the host processors in a computer system may be interconnected by one or more communication connections. These resources may include, for example, data storage devices such as those included in the data storage systems manufactured by Dell Inc. These data storage systems may be coupled to one or more servers or the host processors and provide storage services to each host processor. Multiple data storage systems from one or more different vendors may be connected and may provide common data storage for the one or more host processors in a computer system.

A host processor may perform a variety of data processing tasks and operations using the data storage system. For example, a host processor may perform basic system I/O operations in connection with data requests, such as data read and write operations.

The host processor systems may store and retrieve data using a storage system containing a plurality of host interface units, disk drives (or more generally data storage devices), and disk or storage device interface units. The host systems access the storage device through a plurality of channels provided therewith. The host systems provide data and access control information through the channels to the storage device and the storage device provides data to the host systems also through the channels. The host systems do not address the physical storage devices directly, but rather, access what appears to the host systems as a plurality of logical disk units. The logical units may or may not correspond to the actual physical devices or drives.

SUMMARY OF THE INVENTION

In accordance with one aspect of the techniques herein is a method of performing data deduplication comprising: receiving one or more write operations that writes first data; partitioning the first data into a plurality of data portions; generating, using a first hash function, a plurality of data deduplication hash values for the plurality of data portions, wherein a first data portion is included in the plurality of data portions and a first data deduplication hash value of the plurality of data deduplication hash values is produced by said generating for the first data portion; performing first processing using a Bloom filter to determine whether the first data deduplication hash value has a corresponding first entry in a data store of deduplication hash values; and responsive to the first processing determining the first data deduplication hash value does not have the corresponding first entry in the data store of deduplication hash values, performing second processing, said second processing including adding the corresponding first entry in the data store of deduplication hash values. The first processing may further include: determining, in accordance with Bloom filter hash functions and the first data deduplication hash value, a first set of bit positions of the Bloom filter, wherein each bit position in the first set identifies a bit position in the Bloom filter; querying the Bloom filter to determine whether any bit position of the first set has a corresponding bit position in the Bloom filter that is set to zero; and responsive to determining that at least one bit position of the first set has a corresponding bit position in the Bloom filter that is set to zero, determining that the first data deduplication hash value does not have the corresponding first entry in the data store of data deduplication hash values. The method may include responsive to determining that no bit position of the first set has a corresponding bit position in the Bloom filter that is set to zero, determining that the first data deduplication hash value may have the corresponding first entry in the data store of data deduplication hash values and performing additional processing to definitely determine whether the first data deduplication hash value has the corresponding first entry in the data store of data deduplication hash values. The additional processing may include querying the data store of data deduplication hash values to determine whether the first data deduplication hash value has the corresponding first entry in the data store of data deduplication hash values. The method may include responsive to said querying the data store of data deduplication hash values determining the first data deduplication hash value has the corresponding first entry in the data store of data deduplication hash values, discarding the first data portion and determining that the first data portion is already stored in a data store of deduplicated data portions. The method may also include, responsive to said querying the data store of data deduplication hash values determining the first data deduplication hash value does not have the corresponding first entry in the data store of data deduplication hash values, performing other processing. The other processing may include: adding the corresponding first entry in the data store of deduplication hash values; storing the first data portion in the data store of deduplication data portions; and mapping the corresponding first entry to the first data portion as stored in the data store of deduplication data portions. The other processing may include updating the Bloom filter in accordance with the first set of bit positions, wherein each bit position in the first set identifies a bit position in the Bloom filter which is set to one by said updating. The Bloom filter may be a probabilistic data structure that provides a definitive indication of particular data deduplication hash values that do not have corresponding entries in the data store of data deduplication hash values, and may provide an indefinite indication of particular data deduplication hash values that have corresponding entries in the data store of data deduplication hash values. The indefinite indication may be a probabilistic indication as to whether particular data deduplication hash values have corresponding entries in the data store of data deduplication hash values. The second processing may include storing the first data portion in a data store of deduplicated data portions and updating the Bloom filter in accordance with the first data portion. The data store of deduplication data portions may include only a single unique instance of each data portion processed in connection with data deduplication. The generating may be performed in a GPU (graphics processing unit) domain. The generating may include a plurality of processors executing a same first instruction stream in parallel, wherein the same first instruction stream may include code of the first hash function. Each of the plurality of processors may receive as input a different one of the plurality of data portions and may generate a different one of the plurality of data deduplication hash values that corresponds to the different one of the plurality of data portions. The first processing may be performed in the GPU domain and may include executing second code, by one or more processors of the GPU domain, that uses the Bloom filter to determine whether the first data deduplication hash value has a corresponding first entry in a data store of deduplication hash values. The method may include journaling write operations that add new entries to the data store of deduplication hash values.

In accordance with another aspect of the techniques herein is a system comprising: one or more processors; and a memory comprising code stored thereon that, when executed, performs method of performing data deduplication comprising: receiving one or more write operations that writes first data; partitioning the first data into a plurality of data portions; generating, using a first hash function, a plurality of data deduplication hash values for the plurality of data portions, wherein a first data portion is included in the plurality of data portions and a first data deduplication hash value of the plurality of data deduplication hash values is produced by said generating for the first data portion; performing first processing using a Bloom filter to determine whether the first data deduplication hash value has a corresponding first entry in a data store of deduplication hash values; and responsive to the first processing determining the first data deduplication hash value does not have the corresponding first entry in the data store of deduplication hash values, performing second processing, said second processing including adding the corresponding first entry in the data store of deduplication hash values In accordance with another aspect of the techniques herein is a computer readable medium comprising code stored thereon that, when executed, performs a method of performing data deduplication comprising: receiving one or more write operations that writes first data; partitioning the first data into a plurality of data portions; generating, using a first hash function, a plurality of data deduplication hash values for the plurality of data portions, wherein a first data portion is included in the plurality of data portions and a first data deduplication hash value of the plurality of data deduplication hash values is produced by said generating for the first data portion; performing first processing using a Bloom filter to determine whether the first data deduplication hash value has a corresponding first entry in a data store of deduplication hash values; and responsive to the first processing determining the first data deduplication hash value does not have the corresponding first entry in the data store of deduplication hash values, performing second processing, said second processing including adding the corresponding first entry in the data store of deduplication hash values. The first processing may further include: determining, in accordance with Bloom filter hash functions and the first data deduplication hash value, a first set of bit positions of the Bloom filter, wherein each bit position in the first set identifies a bit position in the Bloom filter; querying the Bloom filter to determine whether any bit position of the first set has a corresponding bit position in the Bloom filter that is set to zero; and responsive to determining that at least one bit position of the first set has a corresponding bit position in the Bloom filter that is set to zero, determining that the first data deduplication hash value does not have the corresponding first entry in the data store of data deduplication hash values. The method may include, responsive to determining that no bit position of the first set has a corresponding bit position in the Bloom filter that is set to zero, determining that the first data deduplication hash value may have the corresponding first entry in the data store of data deduplication hash values and performing additional processing to definitely determine whether the first data deduplication hash value has the corresponding first entry in the data store of data deduplication hash values. The additional processing may include querying the data store of data deduplication hash values to determine whether the first data deduplication hash value has the corresponding first entry in the data store of data deduplication hash values.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
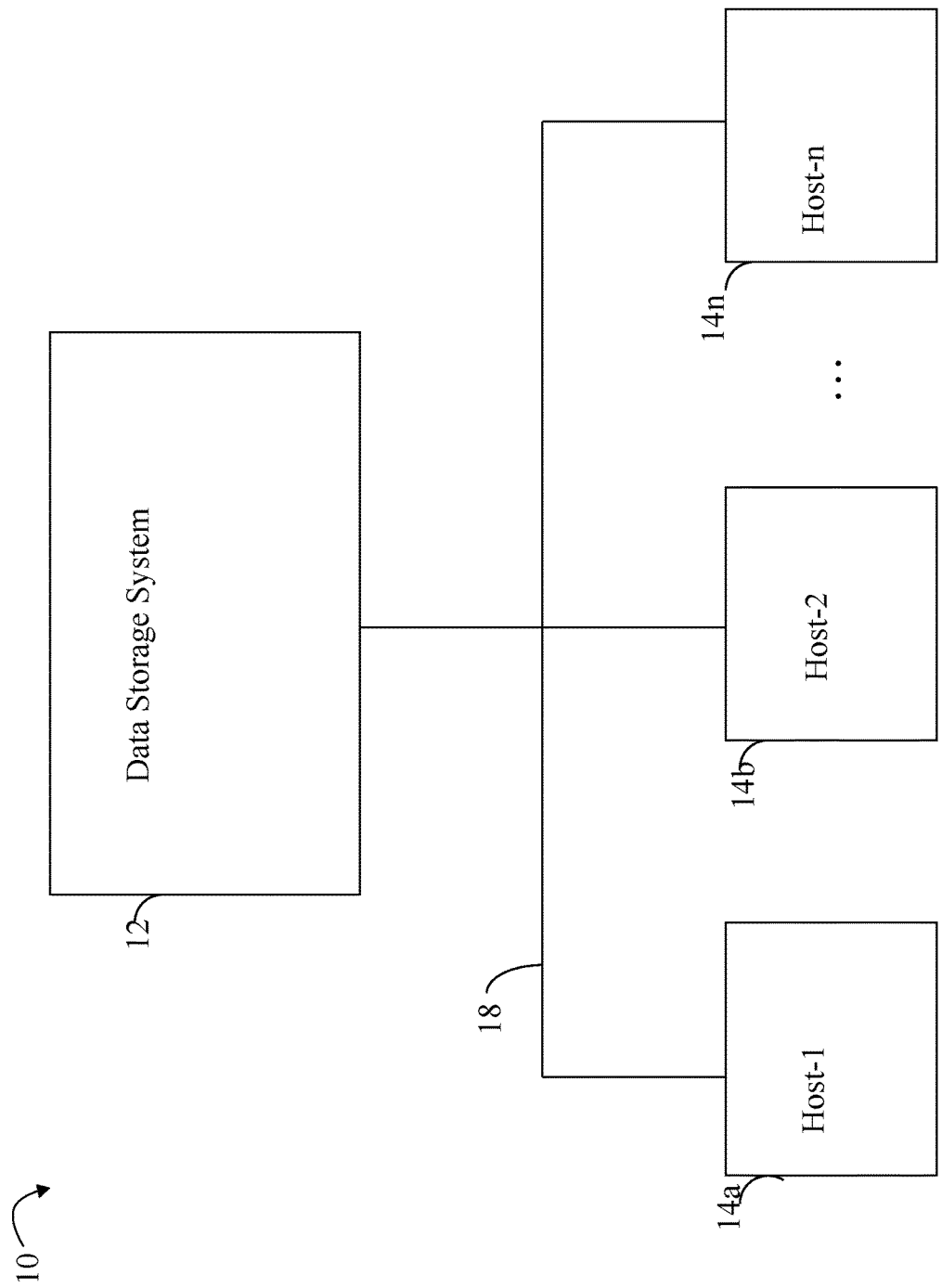
FIGS. 1 and 9 are examples of components of various systems in an embodiment in accordance with the techniques herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intelbased processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and the data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
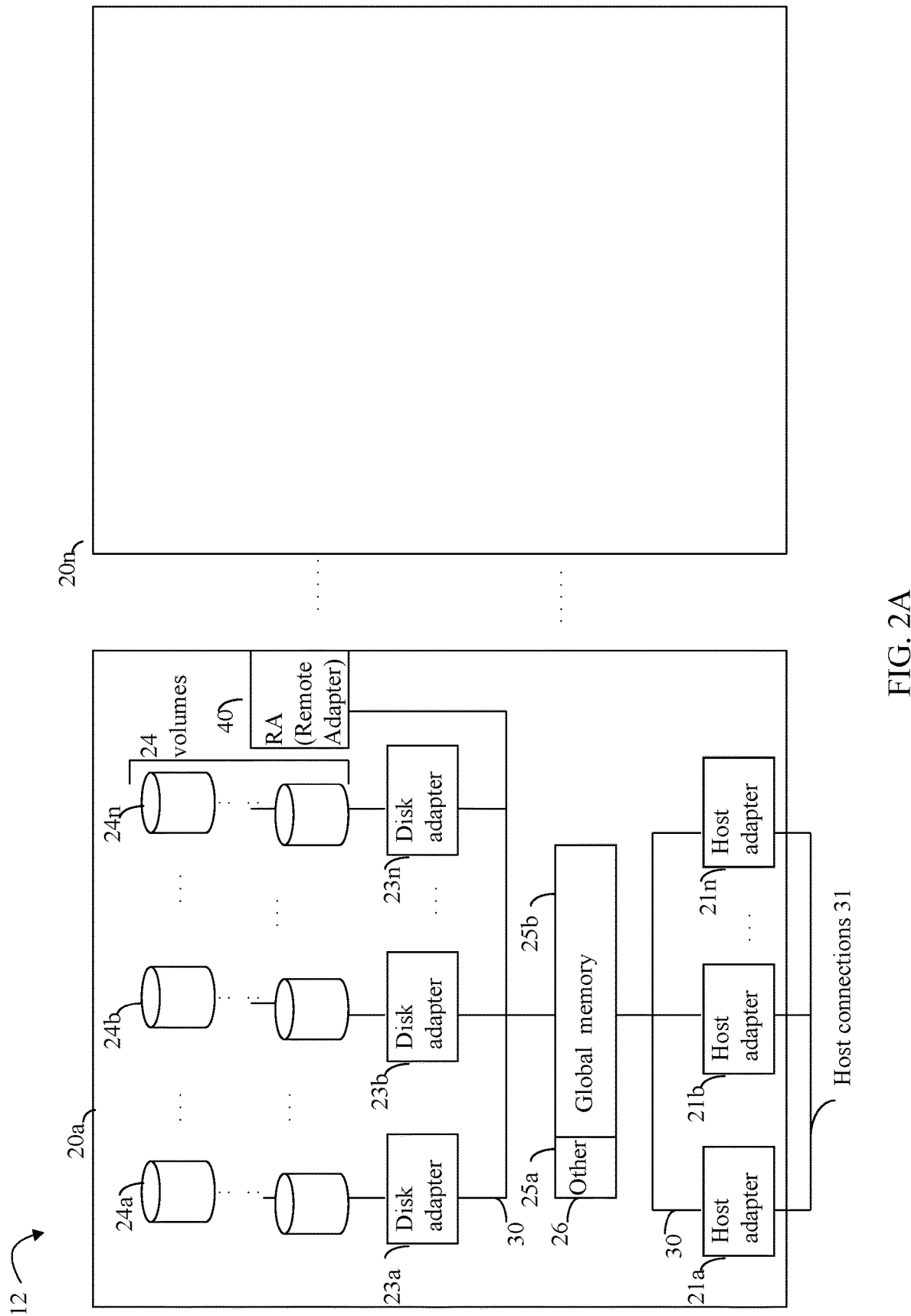
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of the element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, the host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to the one or more host systems from what the host systems view as a plurality of logical devices, logical volumes or logical units (LUNs). The LUNs may or may not correspond to the actual disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
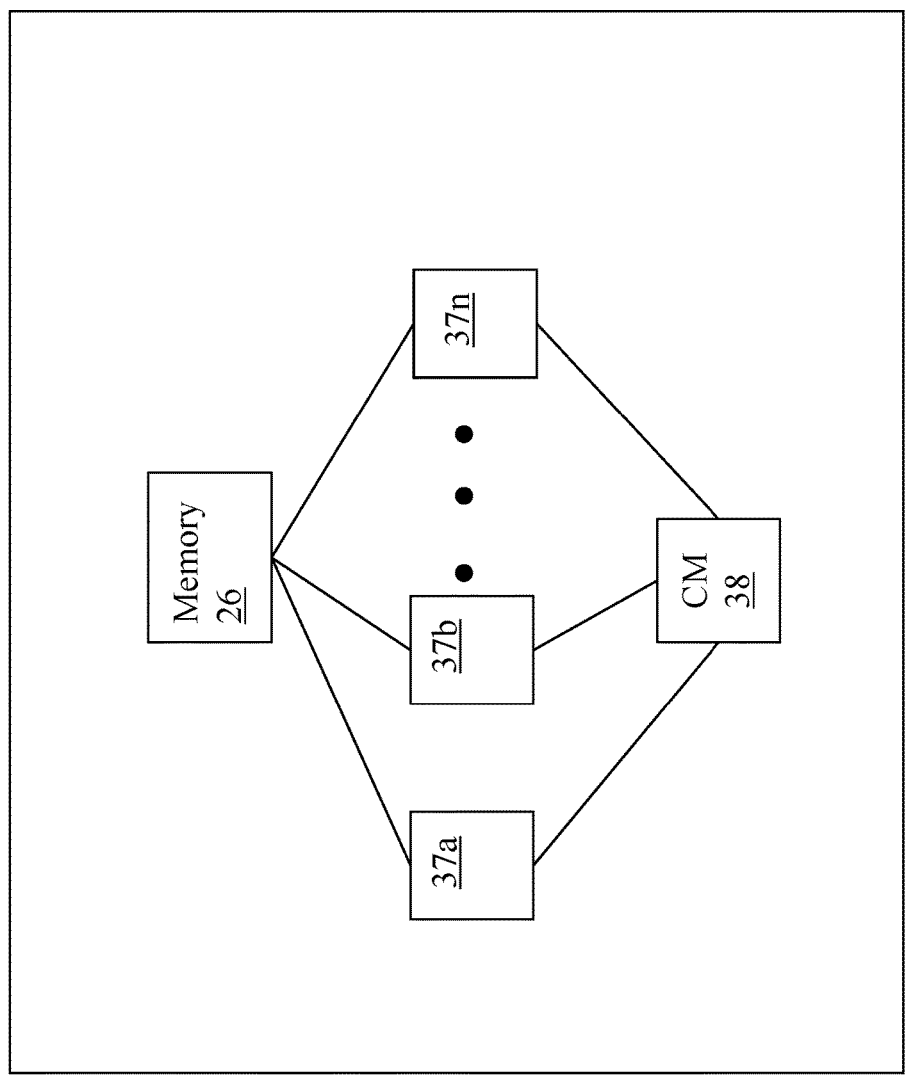
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with the techniques herein, components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Deduplication is a known technique for reducing the physical media needed to store data. Data deduplication techniques eliminate redundant or duplicate copies of the same data by keeping a single copy of the data or content and providing a digest, a token, a signature or other reference identifying the single copy of the data or content. The reference or token may be used to describe multiple instances of a same copy of data such as may be present, for example, when backing up a same set of data at different points in time, when storing identical copies of the same document, and the like. Deduplication effectiveness in reducing the amount of physical storage requirements relies on the fact that, for example, business applications tend to store data in formats that include identical subsets or portions of data. For example, email servers may hold many identical copies of the same documents. Additionally, the advent of remote desktop environments means that entire operating system images may be stored in duplicate, with only the state data being different for each user's environment.

Generally, the deduplication process includes assigning hash values to subsections or portions of data using a hashing function that minimizes the possibility of hash value collisions. The deduplication technique may use any suitable hashing algorithm or technique to generate a hash value for a data portion (where the hash value may be used as the reference for the data portion). For example, existing deduplication techniques may use a well-known hashing algorithm such as, for example, cryptographic hashing algorithms such as MD5, SHA-1, SHA-256 and the like. Generally, as long as there is an acceptably low probability of hash value collision, any suitable hashing algorithm may be used as a hash function to obtain a unique representation, such as a hash value, of a much larger data portion. Thus, two data portions that have matching hash values may be determined as duplicates. If a first data portion has a first corresponding hash value, a second data portion has a second corresponding hash value, and the first and second corresponding hash values do not match, the first and second data portions are unique and determined not to be duplicates (e.g., determine that the first and second data portions do not match if their corresponding hash values are different).

In at least one embodiment in accordance with the techniques described herein in following paragraphs, the hash function used may be any suitable cryptographic hash function. Examples of some cryptographic hash functions are mentioned herein and these, as well as others, are known in the art. In such an embodiment as described herein, the input data provided as the input to the hash function may referred to as the input data, the data portion or the message; and the function or algorithm output may be referred to as the hash, the hash value, the message digest or simply the digest. Thus, generally an input data set may be partitioned into data portions where each such data portion is an input to the hash function for which a hash value is determined.

Deduplication includes additional processing performed after the hash values for data portions are calculated. The additional processing includes determining whether or not a new data portion is a duplicate of an existing data portion already stored in a database or other data container (e.g., whether a new data portion is a duplicate of an existing data portion already stored, or whether the new data portion is not a duplicate of an existing data portion already stored). The foregoing may include searching a data structure of stored hash values, such as by look-up in an ordered table of stored hash values, to see if the newly calculated hash values for a new set of data portions already exist. The table of entries may be indexed or accessed by hash values (e.g., a hash value for a data portion may map to an entry of the table where it is desirable that hash collisions, where multiple hash values map to the same entry, are eliminated or otherwise minimized). Each entry of the table may be null or empty, or otherwise non-null/not empty. An entry indexed by (e.g., accessed using or mapped to) a particular hash value is null/empty if a data portion having the particular hash value does not already exist in the database. An entry indexed by (e.g., accessed using or mapped to) a particular hash value is otherwise non-null/non-empty and maps to (e.g., identifies) an existing data portion currently stored in the database. Thus, if a newly calculated hash value for a new data portion matches an existing entry in the table, the new data portion is a duplicate of an existing data portion. If a newly calculated hash value for a new data portion does not match an existing entry in the table (e.g. there is no existing non-empty/non-null entry in the table for the newly calculated hash value), the new data portion is not a duplicate of an existing data portion. If the new data portion is not a duplicate, processing may further include adding the newly calculated hash value as a new entry to the table and adding the new data portion to the database or container of data portions. If the new data portion is a duplicate of an existing data portion in the database, there is a match between the newly calculated hash value and an existing non-null/non-empty entry in the table (e.g. there is already an existing non-empty/non-null entry in the table for the newly calculated hash value). In this latter case (e.g., where the new data portion is determined as a duplicate based on the existence of a non-empty/non-null entry in the table for the newly calculated hash value), the new data portion is not added to the database and no new entry is added to the table. Additional processing may be performed depending on the particular embodiment.

Figure 3:
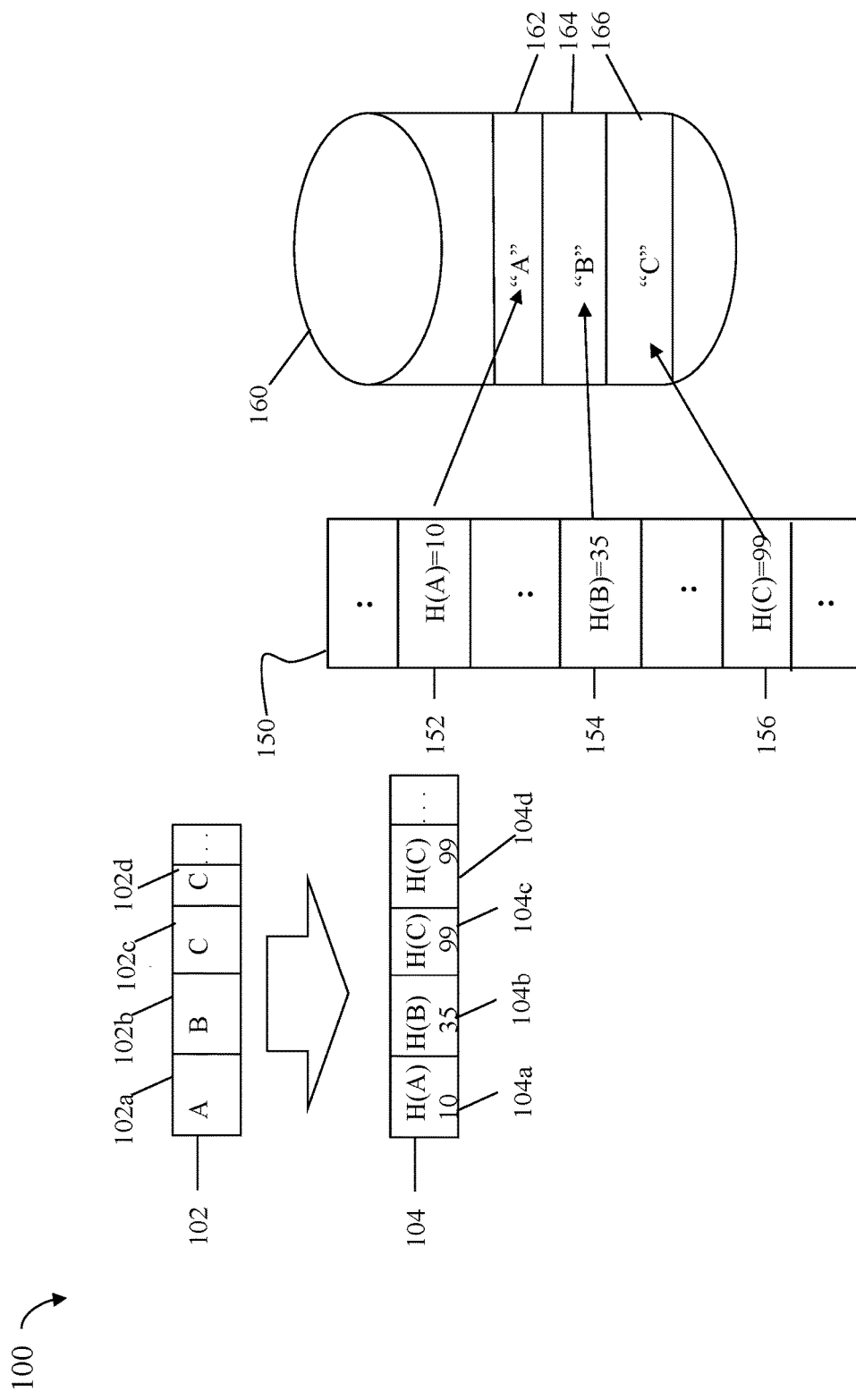
FIG. 3 is an example illustrating a portion of components that may be used in connection with data deduplication processing in an embodiment in accordance with the techniques herein.

Referring to FIG. 3, shown is an example illustrating use of deduplication in at least one embodiment. The example 100 includes an input data stream or set 102 partitioned into data portions. In this example, the elements 102a, 102b, 102c and 102d are 4 data portions included in the input data set 102. The element 104 denotes corresponding hash values or digests determined for the data portions of 102. In particular, H(A) 104a denotes the hash value or digest of 10 determined using a hash function for the data portion A 102a; H(B) 104b denotes the hash value or digest of 35 determined using the hash function for the data portion B 102b; H(C) 104c denotes the hash value or digest of 99 determined using the hash function for the data portion C 102c; and H(C) 104d denotes the hash value or digest of 99 determined using the hash function for the data portion C 102d. It should be noted that the particular hash values of 10, 35 and 99 included in 104 may denote values typically much smaller than those obtained from using cryptographic and other hash functions. However, such values are used in the example 100 for simplicity of illustration. The hash function used, such as the SHA-1 or other cryptographic hash, to generate hash values or digests for the data portions of 102 may also sometimes be referred to herein as a data deduplication hash function. Similarly, hash values or digests 104a-d generated using the data deduplication hash function respectively, for data portions 102a-d may also sometimes be referred to herein as data deduplication hash values or digests.

The element 150 represents a structure or a data store of the hash values or the digests. The element 150 may also be referred to as the digest data base. In the example, the element 150 may be a table or an ordered list of indices where the structure is indexed by a data deduplication digest or a hash value. Thus, for example, the element 152 denotes the entry of the table obtained via look-up for an index value of 10, which in this example is H(A) 104a. The element 154 denotes the entry of the table obtained via look-up for an index value of 35, which in this example is H(B) 104b. The element 156 denotes the entry of the table obtained via look-up for an index value of 99, which in this example is H(C) 104c and 104d. The element 160 represents the database, or more generally the data container or the data store, including the single instance or single copy of each of the different data portions.

In this example, assume that the data portions 102a-c are not already in the database 160 whereby processing of the hash values 104a-104c results in determining that, for the hash values 104a-c, there are no matching existing non-null/non-empty entries in the table 150. As a result, the new entries 152, 154 and 156 are inserted, respectively, for the hash values 104a, 104b and 104c. Additionally, the data portions 162, 164 and 166 are added to the database 160 for the newly added entries, respectively, 152, 154 and 156. Entries 152, 154, 156 are, respectively, mapped to corresponding data portions 162, 164, 166 in the database 160.

Processing may now be performed for the hash value 104d H(C). In this case, processing is performed to index the table by the hash value 104(d) H(C)=99 which returns a matching entry 156 (e.g., entry 156 exists which is non-null/non-empty). Thus processing determines that, for the hash value 104d H(C)=99, there is already a matching existing non-null/non-empty entry 156 in the table 150 and the data portion 102d is determined to be a duplicate of the existing data portion 166. As a result, the data portion 102d may be discarded and no new entry is added to the table 150.

Hashing algorithms, such as used in connection with deduplication techniques as just described in connection with FIG. 3, are generally inherently serial in nature, where a CPU core executing code for the hashing algorithm can only process one data portion at a time. Multiple CPU cores can be used to process different portions of data in parallel. However, use of the multiple CPU cores means that such CPU cores are not available for other system processing during that time and may adversely impact system performance. Additionally, CPU utilization, I/O latency and system performance may be further adversely impacted depending on the size of the table 150 and size of each of the data portions 102 provided as the inputs to the hashing algorithm.

Described in following paragraphs are techniques that may be used in connection with optimizing or accelerating processing performed in connection with data deduplication. Such techniques described in following paragraphs may be generally used with any suitable hashing algorithm, the hash table of hash values 150 and the data base 160 that may be utilized in an embodiment in connection with data deduplication. In at least one embodiment in accordance with the techniques herein, one or more GPUs (graphics processing units) or GPU devices may be utilized whereby at least some of the processing described herein that is amenable to parallel processing may be performed by the GPU rather than the CPU. In at least on embodiment in accordance with the techniques herein, a Bloom filter data structure may also be utilized. The foregoing and other aspects are described in more detail in following paragraphs.

The techniques described in following paragraphs may be used in connection with any suitable data portion size. However, the size of each data portion or hash function input for which a hash value is generated is important and the particular data portion size selected may vary with aspects of the particular data domain under consideration. For example, choosing too large of a data portion size may result in an excessive number of unique data portions with less than desired duplicates detected. For example, two data portions of a large size which differ even by a single bit means that such two data portions would not be considered duplicates. Thus, reducing the size of each data portion considered for deduplication may generally increase the number of duplicate data portions determined. However, care must be taken not to select a data portion size which is too small for the particular data domain under consideration. Using smaller data portion sizes means that the number of data portions, and thus hash value calculations, for a given data set increases. The size of the data portion input to the hash algorithm or function may also be referred to herein as the data deduplication size granularity.

For a hash algorithm such as SHA-1, as an example, which may take an arbitrary size input, the hash values for each sub-section of data may be 20 bytes in length. If 8 KiB (e.g., 8*1024 bytes) data portion sizes are used, this would result in the necessity to store as many as 16 hash values for each 128 KiB (e.g., 128*1024 bytes) track being stored. Thus, for each 250 TiB of deduplicated track data stored (e.g., in database 160), the look-up table (e.g., table 150) needs to be 640 GiB. For reasonable look-up performance, an embodiment in accordance with the techniques herein may keep the table 150 in some form of sorted order. For example, the table 150 may alternatively be implemented as an ordered binary tree (e.g., a binary search tree).

At least one embodiment in accordance with the techniques herein may determine hash values for the data portions each of which is 128 KiB, which may also be the size of a track of data in the embodiment in a block storage device. In such an embodiment where the data deduplication hashing algorithm is SHA-1, a complete set of SHA-1 hashes for 250 TiB may occupy 40 GiB of storage.

Generally and consistent with discussion herein, the table 150 may generally be a digest database or data container having an order in accordance with the hash values generated by the hash function or algorithm selected in an embodiment. The order of the table 150 may be maintained to allow for expedited look-up based on the generated hash values. As will be appreciated by those skilled in the art, the techniques herein may be used in connection with any suitable size table or other digest data container. Different factors may be considered when selecting a size of the table 150 or other digest data container used in a particular embodiment. As appreciated by those skilled in the art, for example, resources (e.g., processor cycles/time, memory) utilized in connection with searching/lookups and also used in maintaining and management of the table 150 may increase as the size of the table 150 increases.

As mentioned above, an embodiment in accordance with the techniques herein may execute at least some processing described in more detail elsewhere herein on a GPU rather than a CPU. Such partitioning of processing among the GPU and the CPU offloads processing from the CPU to the GPU. In this manner, additional CPU time may now be available to perform other processing of other tasks such as related to I/O processing. Performing the other tasks may including executing code, for example, that is not amenable to parallel processing as performed by the GPU (e.g., with a same instruction stream executing in parallel). A high-level programming difference between CPUs and GPUs is that GPUs are as used herein are optimized for data-parallel workloads, while CPU cores are optimized for executing a single stream of instructions as quickly as possible. A GPU may be characterized as a SIMD (single instruction stream-multiple data stream) device optimized for executing the same instruction stream in parallel. Generally, a single GPU includes multiple cores where all cores may execute the same instruction stream simultaneously/in parallel and where each of the different cores or instruction stream execution instances may operate on different data. Thus, for example, a GPU including 32 cores may perform parallel processing of the same code or instruction stream, where each of the 32 cores execute the same instruction stream on a different data set (e.g., different data inputs and outputs).

In one embodiment in accordance with the techniques herein, processing may be partitioned between the CPU domain and the GPU domain. The CPU domain may include one or more CPUs and the GPU domain may include one or more GPUs or GPU devices. In such an embodiment, rather than perform all processing in the CPU domain, the techniques described herein may partition processing between the GPU domain and the CPU domain. For example, as described in more detail elsewhere herein, processing may be performed in parallel on the GPU for simultaneous calculation of multiple data deduplication digests or hash values where each such digest or hash value may be computed using the same hashing algorithm. In at least one embodiment with a GPU having 32 cores or more generally capable of executing 32 simultaneous streams of the same instruction/code stream operating, respectively, on 32 different data streams or inputs, 32 digests or hash values may be computed in parallel on the GPU.

Processing as described herein as being performed by the GPU may also be performed by other hardware component(s) providing similar functionality to that of the GPU. An embodiment of the techniques herein may, for example, select to perform processing steps which are computationally intensive and amenable for parallelization using the GPU while performing other processing serially in the CPU. Both the CPU and the one or more GPUs may be included in the same system. Code that executes in the GPU may be programmed, for example, using the CUDA programming language designed to exploit parallel processing characteristics of the GPU. The GPU can handle thousands of concurrent programming threads, each running one element of a parallel computation. To facilitate parallel programming, CUDA organizes these threads in blocks, and the threads blocks are organized in a grid. The threads in a thread block can be indexed in one, two, or three dimensions, and the grid can be indexed in one or two dimensions. In an embodiment described herein in following paragraphs, the function calls that run in the GPU are called "kernels", and are launched from the CPU. Each kernel corresponds to a portion of parallel code that may be executed by multiple threads, where such threads are organized into a number of blocks. A "grid" of blocks may be run as a unit of computation on the GPU where all threads in the grid may execute concurrently and each such thread may operate on different data (e.g., each thread executing in parallel executes the same instruction stream but each thread may execute using different input data and generate different output data independent of the other concurrently executing threads of the same grid).

As described herein, the CPU may be included in a data storage system (e.g. as one of the one or more main CPU(s) of the data storage system), and the GPU may be located, for example, on a plug-in card of the system also referred to as the GPU device. Thus, the CPU and GPU may be included in the same system (such as the same data storage system) and may communicate, for example, using a bus such as a PCIe (Peripheral component interconnect express) bus. As known in the art, the GPU device may have different types of memory forming a memory hierarchy each with different size, speed, and usage. Typical data flow between the CPU and GPU may include the CPU copying data to memory of the GPU. Instructions such as those included in the kernel may also be copied to the memory of the GPU. The GPU then asynchronously executes code of the kernel (e.g. multiple threads concurrently execute the same portion of code corresponding to the kernel with each concurrent thread operating on different data). When the CPU executes code that makes a call to copy data from the GPU memory back to the computer memory, the call may block until all threads have completed processing and the output data is available. At this point, the results, such as the output data, may be transmitted from the GPU to the CPU.

An embodiment in accordance with the techniques herein may use one or more GPUs in components by NVIDIA, such as GPUs in the TESLA series based on NVIDIA's massively parallel CUDA architecture, to perform processing of the lossless compression/decompression techniques described herein. As known in the art, the CUDA architecture consists of hundreds of processor cores that operate together to process application data. An application having code executed by GPUs in accordance with the CUDA architecture may include code that performs parallel processing. An application developer may modify an application including code which performs steps sequentially to perform appropriate portions in parallel on cores of the one or more GPUs with remaining portions of the application being executed by the CPU. Mapping a function to the GPU may include rewriting the function to expose the parallelism in the function and adding code to move data to and from the GPU. In at least one embodiment in accordance with the techniques herein, the developer may be tasked with launching many threads simultaneously and the GPU hardware manages the threads and does thread scheduling. Additional detail regarding how processing performed in connection with the techniques herein may be partitioned between the CPU domain and the GPU domain is described elsewhere herein.

As noted above, the techniques herein may use a Bloom filter. A Bloom filter is known in the art and may be characterized as a space-efficient probabilistic data structure that may be used to test whether an element is a member of a set. False positive matches are possible, but false negatives are not. In other words, a query returns either "possibly or may be in set" or "definitely not in set". The more elements that are added to the set, the larger the probability of false positives.

In connection with the techniques herein, the Bloom filter may be used to test whether a data portion is a duplicate of an existing data portion already stored in the database or the data container of data portions 160. In particular, as described in more detail below, the techniques herein may use the digest for the data portion in connection with the Bloom filter to test whether there is already an existing entry in the digest table 150 (e.g., whether a corresponding digest for a data portion maps to an existing non-null entry in the table). A Bloom filter provides one of two responses: it gives a definitive answer if a value is not found in the table 150, or determines that the value "may be" in the table 150 (e.g., a probabilistic determination of yes whereby there is an associated probability of the yes response being incorrect and thereby a false positive). For example, a Bloom filter that generates 10 bits for each entry may provide a false positive rate of no more than 1% while providing a 100% correct response for a negative result (e.g., that a newly calculated digest or hash value is not in the table).

In at least one embodiment in accordance with the techniques herein, the SHA-1 algorithm may be used as the data deduplication hashing technique to generate the data deduplication hash values 104 for data portions 102 where each data portion may be 128 KiB in size. In such an embodiment, the Bloom filter may use 10 bits (e.g., K=10 in discussion below) for each entry and the Bloom filter (e.g., including "M" bit positions in discussion below) may be 2.5 GiB in size to cover the complete set of possible hashes generated by the hashing algorithm for the 250 TiB of deduplicated data as described above.

Consistent with discussion herein, a Bloom filter is a data structure used to check for membership of an element "X" in a set of "M" elements. In connection with the techniques herein, the "M" elements may denote the unique or single instances of data portions stored in the database 160. Additionally, the "M elements" may also correspond to the entries in the table 150 of digests for the desired single instances of the data portions stored in the database 160. "X" may denote a digest for a data portion D1 for which a determination is being made as to whether "X" has a corresponding existing non-empty/non-null entry in the table 150 mapping to an existing single copy of the data portion D1 in the database 160, or whether the table 150 includes a null entry for "X" thereby indicating that database 160 does not include the data portion D1.

Figure 4:
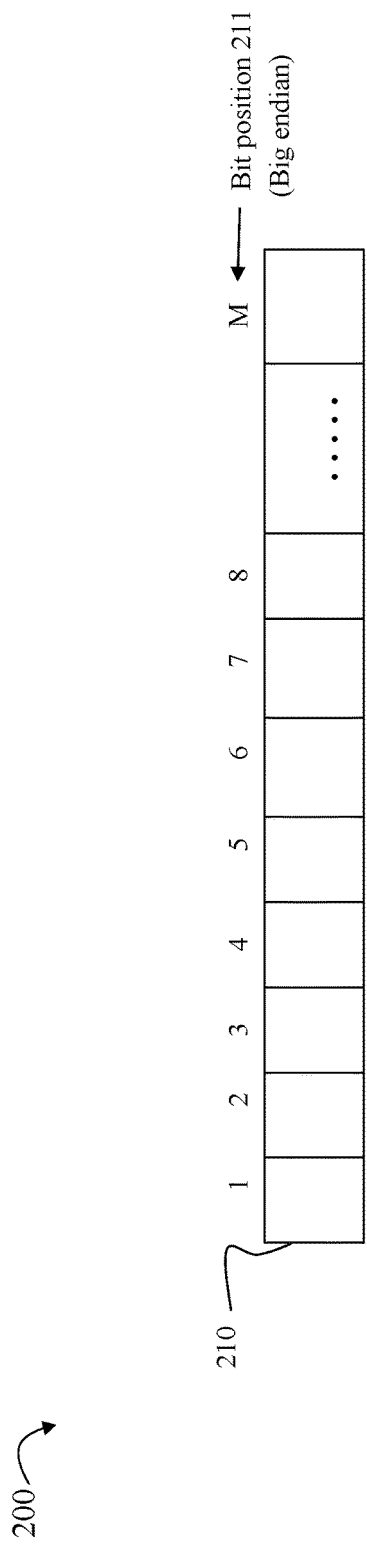
FIG. 4 is an example of a Bloom filter data structure that may be used in connection with data deduplication processing in an embodiment in accordance with the techniques herein.

Referring to FIG. 4, shown is an example illustrating a Bloom filter data structure that may be used in an embodiment in accordance with the techniques herein. The example 200 illustrates the Bloom filter as a bit vector 210 with "M" elements or entries. The bit vector 210 has corresponding entries annotated with bit positions 211 in accordance with Big endian format or layout. An empty Bloom filter may be a bit array or a vector 210 of M bits, all set to 0. An embodiment in accordance with the techniques herein may select and use "K" independent hash functions. The "K" hash functions map or hash the input value "X" to one of the M bit vector positions, generating a uniform random distribution. Each of the K hash functions takes as an input a value "X" and generates a number "I" where I is an integer from 1 to M, inclusively, thereby effectively mapping "X" to a position I in the Bloom filter bit vector 210. In at least one embodiment in accordance with the techniques herein, M may be equal to the number of elements or entries in the table 150 which may also be equal to the number of single instance copies of data portions stored in the database 160. Generally, the precise choice of K and the constant of proportionality of M are determined by the intended false positive rate of the filter. In at least one embodiment in accordance with the techniques herein, "K" may be 10 and "M" may be 20,480 MiB (e.g., 2.5 GiB*8 bits/byte=2.5*1024*8=20,480). In such an embodiment, the rate of false positives may be about 1%. An embodiment may further select different values for K. For example, selecting a larger value for K provides for further decreasing the rate of false positives.

In connection with the techniques herein, a write adding a new element to the table 150 mapped to a corresponding data portion may be performed when the corresponding data portion is not stored in the database 160. Thus processing of such a write includes adding a new non-empty non-null entry to the table 150 and storing the corresponding data portion in the database 160, (e.g., the newly added non-empty non-null entry to the table 150 maps to a corresponding data portion in database 160). Adding an entry in the table 150 for X (denoting a hash value or digest generated for a data portion) includes writing or updating the Bloom filter in accordance with the techniques herein. To add an element or non-null/non-empty entry to table 150 for X, provide X as an input to each of the K hash functions to obtain K bit positions. Then, accordingly set the bits in the Bloom filter 210 at all these K bit positions to 1.

In connection with the techniques herein, processing may be performed to also query for an element and test whether it is in the set (e.g. whether a non-null/non-empty entry exists in the table for a particular data deduplication digest or hash value). In connection with the techniques herein, such querying may be performed using the Bloom filter to determine whether a hash value or digest X of a data portion already has an existing matching entry (non-null/non-empty entry) in the table 150, where such an existing entry maps to an existing instance of the data portion in the database 160. Querying may include providing the hash value or digest X of a data portion as an input to each of the K hash functions and obtaining K bit positions (denoting bit positions in the Bloom filter bit vector 210). If any of the bit values in 210 at these K bit positions is 0, the element (e.g., the hash value or digest X for the data portion D) is definitely not in the set (e.g., not have a matching non-null/non-empty entry in the table 150) and needs to be added (e.g., add a non-empty/non-null entry to table 150 for X, store the data portion in the database 160, and map the added entry for X to the data portion D just stored in 160). If the element was already in the set (e.g. already in the table 150), then all the bits for the identified K bit positions would have been set to 1 when it was inserted. If all bits for the identified K bit positions are 1, then the element "May be" in the set. In this "May be" case, the filter may return a yes response which may either be correct, or may be a false positive. In this "May be case" where the filter returns an "indefinite" yes response, the filter response of yes may be correct if the element is actually in the set, or the yes response may be a false positive where the bits for the identified K bit positions have by chance been set to 1 during the insertion of other elements, thereby resulting in the false positive.

Figure 5:
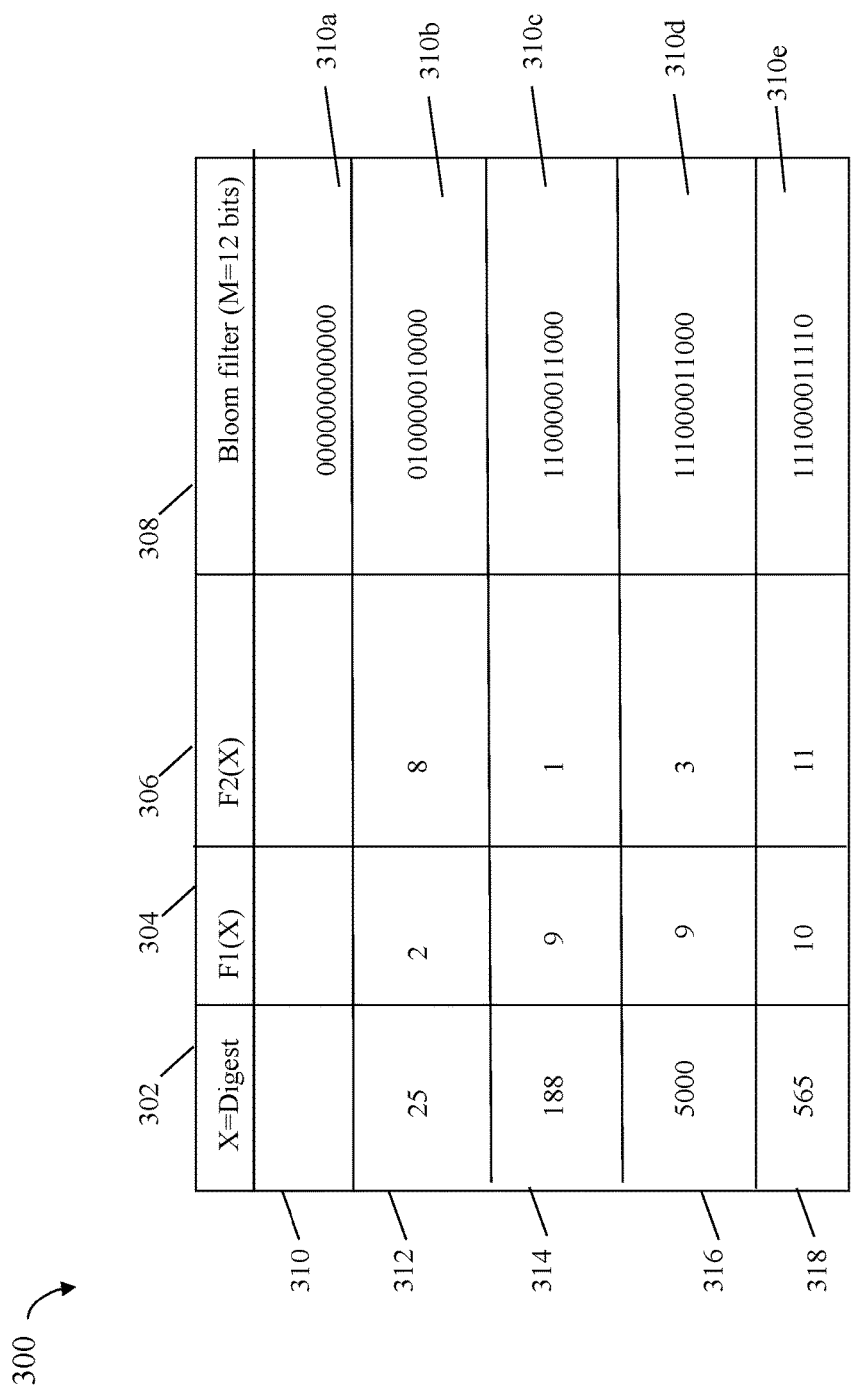
FIGS. 5, 6A, 6B and 7 are examples illustrating data flow and components that may be used in connection with data deduplication processing in an embodiment in accordance with the techniques herein.

To further illustrate, reference is made to the example 300 of FIG. 5. The example 300 of FIG. 5 is a simplified example for illustration purposes where M=12 and K=2. The example 300 includes a table with the following columns: X denoting the data deduplication digest or hash value for a data portion 302, F1(X) 304, F2(X) 306 and a current state of the Bloom filter bit vector 308. K=2 indicates that there are 2 hash functions used that each map an input value X 302 to one of the M=12 bit vector positions in the 12 bit Bloom filter (Big endian format). Each row of the table 300 may denote the state of the Bloom filter in column 308 after performing processing to insert a new non-empty/non-null entry for a particular data value X 302 denoting the digest or hash value for a data portion as determined using the SHA-1 or other data deduplication hash function. For purposes of discussion herein and with this example 300 with K=2, F1 may denote a first hash function and F2 may denote a second hash function. F1 and F2 may also be referred to as Bloom filter hash functions for discussion purposes to distinguish from references to the data deduplication hash function, such as the SHA-1 algorithm, used to determine the digest or hash value X of an original data portion of 102, wherein X is the input provided to each of the Bloom filter hash functions F1 and F2.

The row 310 in the column 308 indicates the state of the Bloom filter (all entries=0) at the start of processing where all entries are null/empty in the table 150 (e.g., the table 150 includes no entries and the database 160 includes no corresponding data portions mapped to any entries in 150). Consider a first original data portion D1 having corresponding information as denoted in the row 312. The data portion D1 may be, for example, a data portion written by a client. For example, a host may issue a write operation that writes data portion D1 to a file, a LUN, or another storage entity storing data for a host application that issued the write. The row 312 indicates that the data portion D1 has a digest or a data deduplication hash value of X=25 and where F1(X)=2 and F2(X)=8. Querying the Bloom filter 310a indicates that the bit positions 2 and 8 are both zero thereby indicating that X=25 is definitely not in the set (e.g., the table 150 does not includes a non-empty/non-null entry for X=25). Thus, a non-null/non-empty entry for a digest or a data deduplication hash value of X=25 is added to the table 150, the original data portion D1 is stored to the database 160, and the newly added entry of table 150 for X=25 is mapped to, or references, the data portion D1 as stored in the database 160. Additionally, the Bloom filter is updated. The row 312 indicates the state of Bloom filter after adding a non-null/non-empty entry for a digest or data deduplication hash value of X=25 for the original data portion D1. The row 312 indicates that for X=25, F1(X)=2 and F2(X)=8 whereby the resulting Bloom filter bit vector 308 has bit positions 2 and 8 set to 1 (e.g., 010000010000).

Subsequent to processing described in connection with the row 312, processing may be performed for a second original data portion D2 having corresponding information as denoted in the row 314. The data portion D2 may be, for example, a data portion written by a client. For example, a host may issue a write operation that writes data portion D2 to a file, a LUN, or another storage entity storing data for a host application that issued the write. The row 314 indicates that the data portion D2 has a digest or a data deduplication hash value of X=188 and where F1(X)=9 and F2(X)=1. Querying the Bloom filter 310b of the row 312 indicates that the bit positions 9 and 1 are both zero thereby indicating that X=188 is definitely not in the set (e.g., the table 150 does not includes a non-empty/non-null entry for X=188). Thus, a non-null/non-empty entry for a digest or data deduplication hash value of X=188 is added to the table 150, the original data portion D2 is stored to the database 160, and the newly added entry of table 150 for X=188 is mapped to, or references, the data portion D2 as stored in the database 160. Additionally, the Bloom filter is updated. The row 314 indicates the state of Bloom filter after adding a non-null/non-empty entry for a digest or data deduplication hash value of X=188 for the original data portion D2. The row 314 indicates that for X=188, F1(X)=9 and F2(X)=1 whereby the resulting Bloom filter bit vector 308 has bit positions 1 and 9 set to 1 (e.g., 110000011000).

Subsequent to processing described in connection with the row 314, processing may be performed for a third original data portion D3 having corresponding information as denoted in the row 316. The data portion D3 may be, for example, a data portion written by a client. For example, a host may issue a write operation that writes data portion D3 to a file, a LUN, or another storage entity storing data for a host application that issued the write. The row 316 indicates that the data portion D3 has a digest or a data deduplication hash value of X=5000 and where F1(X)=9 and F2(X)=3. Querying the Bloom filter 310c of 314 indicates that the bit position 3 is zero thereby indicating that X=500 is definitely not in the set (e.g., the table 150 does not includes a non-empty/non-null entry for X=5000). Thus, a non-null/non-empty entry for a digest or data deduplication hash value of X=5000 is added to the table 150, the original data portion D3 is stored to the database 160, and the newly added entry of table 150 for X=5000 is mapped to, or references, the data portion D3 as stored in the database 160. Additionally, the Bloom filter is updated. The element 310d of the row 316 indicates the state of Bloom filter after adding a non-null/non-empty entry for a digest or data deduplication hash value of X=5000 for the original data portion D3. The row 316 indicates that for X=5000, F1(X)=9 and F2(X)=3 whereby the resulting Bloom filter bit vector 308 has bit positions 3 and 9 set to 1 (e.g., 111000011000).

Subsequent to processing described in connection with the row 316, processing may be performed for a fourth original data portion D4 having corresponding information as denoted in the row 318. The data portion D4 may be, for example, a data portion written by a client. For example, a host may issue a write operation that writes data portion D4 to a file, a LUN, or another storage entity storing data for a host application that issued the write. The row 318 indicates that the data portion D4 has a digest or a data deduplication hash value of X=565 and where F1(X)=10 and F2(X)=11. Querying the Bloom filter 310d of 316 indicates that both the bit positions 10 and 11 are zero thereby indicating that X=565 is definitely not in the set (e.g., the table 150 does not includes a non-empty/non-null entry for X=565). Thus, a non-null/non-empty entry for a digest or data deduplication hash value of X=565 is added to the table 150, the original data portion D4 is stored to the database 160, and the newly added entry of table 150 for X=565 is mapped to, or references, the data portion D4 as stored in the database 160. Additionally, the Bloom filter is updated. The element 310e of the row 318 indicates the state of Bloom filter after adding a non-null/non-empty entry for a digest or data deduplication hash value of X=565 for the original data portion D4. The row 318 indicates that for X=565, F1(X)=10 and F2(X)=10 whereby the resulting Bloom filter bit vector 308 has bit positions 10 and 11 set to 1 (e.g., 111000011110).

Thus, the foregoing illustrates processing that may be performed to add new non-null/non-empty entries to the table 150 for 4 digest or data deduplication hash values X as denoted in the column 302 and also store the data portions D1-D4 in the database 160. As just described, when adding a new non-null/non-empty entries to the table 150 for a data deduplication hash value, the Bloom bit vector is also accordingly updated in accordance with the Bloom filter hash function outputs generated when provided the data deduplication hash value as the input.

Figure 6A:
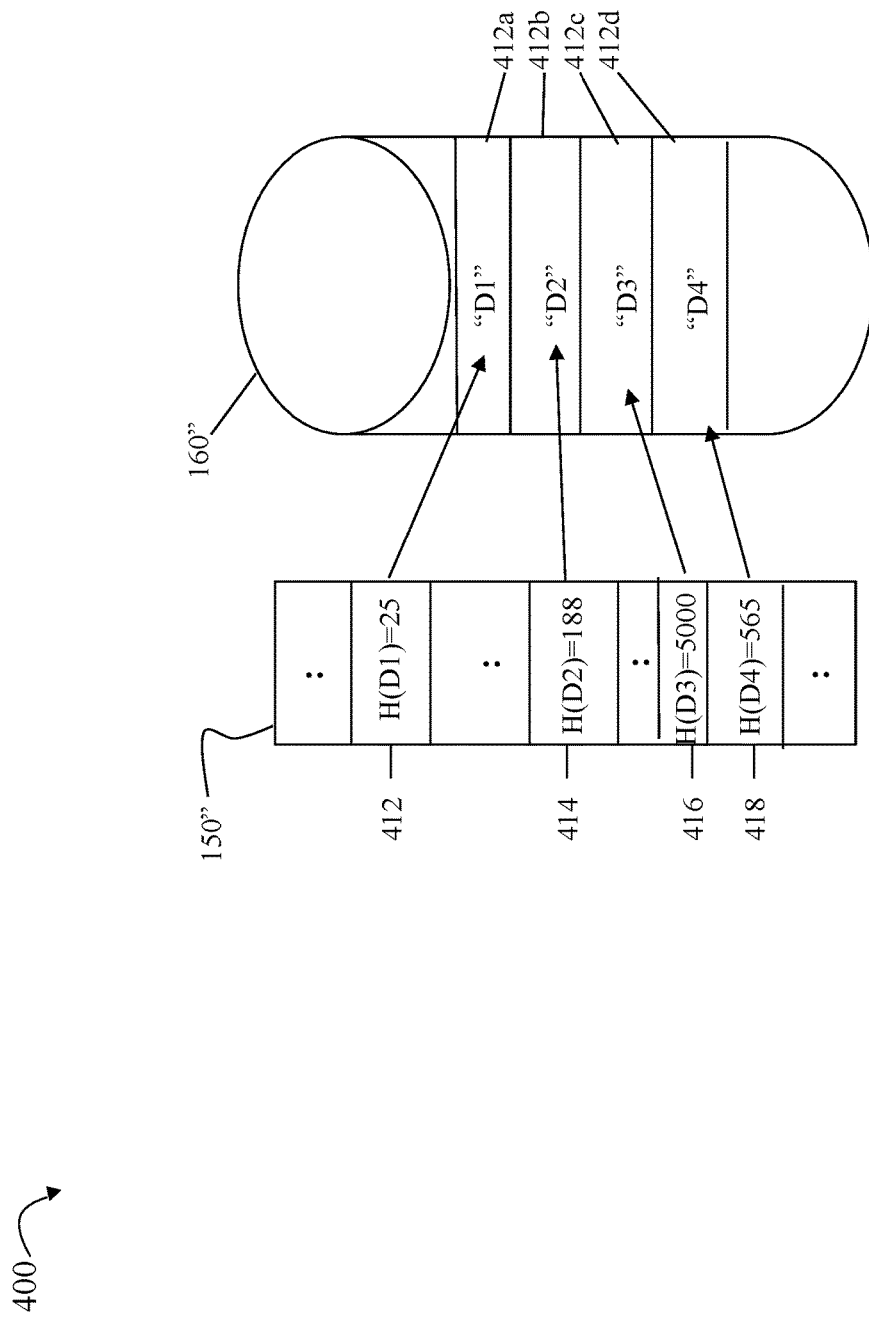

Referring to FIG. 6A, shown is an example 400 illustrating the state of the table 150" and the database 160" after performing processing as described in connection with the data portions D1-D4 and the associated data deduplication digests and other values as illustrated and described in connection with FIG. 5. The table 150" and the database 160" are similar, respectively, to the table 150 and the database 160 as described above with the difference that the table 150" and the database 160" reflect contents of such structures or components after performing processing as described in connection with FIG. 5. In particular, the entries 412, 414, 416 and 418 are existing non-null/non-empty entries created, respectively, by processing described in connection with the rows 312, 314, 316 and 318 of FIG. 5. The elements 412a, 414a, 416a and 418a denote the data portions D1-D4 stored, respectively, in connection with processing described above for the rows 312, 314, 316 and 318 of FIG. 5.

At this point in time assume the state of the table 150" and the database 160" are as illustrated in FIG. 6A, and that the Bloom filter bit vector is illustrated by 310e. Now, suppose a new data portion J3 is processed having an associated data deduplication hash value J4=100. The new data portion J3 may be, for example, another data portion written by a client. For example, a host may issue a write operation that writes the data portion J3 to a file, a LUN, or another storage entity storing data for a host application that issued the write. The value for the data-deduplication hash value J4=100 is provided as an input to each of the hash functions F1 and F2. In this example, assume that X=J4=100, F1(J4)=10 and F2(J4)=11. The bit positions 10 and 11 of the Bloom filter bit vector 310e are examined. If any one or more (e.g., at least one) of the bit positions 10 and 11 has a bit value of 0, then J4=100 is not a member in the set. In other words, if any one of the bit positions 10 and 11 has a bit value of 0, then there is no existing non-null/non-empty entry in the table 150 corresponding to the data deduplication hash value or the digest of J4=100. In this example, bit position 10 has a value of 1 and the bit position 11 has a value of 1. Thus, the Bloom filter indicates and reports that J4=100 "may be" a member in the set whereby there "may be" an existing non-null/non-empty entry in the table 150 corresponding to the data deduplication hash value or digest of J4=100. Additionally, the Bloom filter in this example also indicates that there "may be" an instance of the data portion J3 currently stored in the database 160. In this case, the Bloom filter alone does not provide a definitive indication or answer as to whether table 150 already includes an existing non-null/non-empty entry for the data deduplication hash value or digest J4=100. Additionally and consistent with the foregoing, the Bloom filter alone does not provide a definitive indication or answer as to database 160 already includes a stored instance of the data portion J3.

Accordingly, in cases where the Bloom filter provides a "may be" or indefinite indication (e.g., a probabilistic yes response with a 99% chance of yes being correct and with a 1% change of yes being a false positive) as in the last case of J3 and J4 above, processing may further include accessing the table 150 and performing a lookup or query of the table 150 directly to determine whether table 150 includes an existing non-null/non-empty entry for the data deduplication hash value or digest J4=100. If table 150 includes an existing non-null/non-empty entry matching the data deduplication hash value or digest J4=100, the data portion J3 may be discarded since the existing entry in the table for J4=100 indicates that the data portion J3 is already in the database 160. Otherwise, if there is no existing non-null/non-empty matching entry for the data deduplication hash value or digest J4=100 (e.g., entry for J4=100 is null/empty), then processing may be performed to add a new element to the set or rather add a new non-null/non-empty entry to the table 150 for the data deduplication hash value or digest of J4=100. Consistent with discussion herein, in connection with no matching non-null/non-empty entry in the table for J4=100, processing may also be performed to store the data portion J3 to the database 160 and map the new/non-null entry of the table (just added for the data deduplication hash value or digest of J4=100) to the stored data portion J3.

Figure 6B:
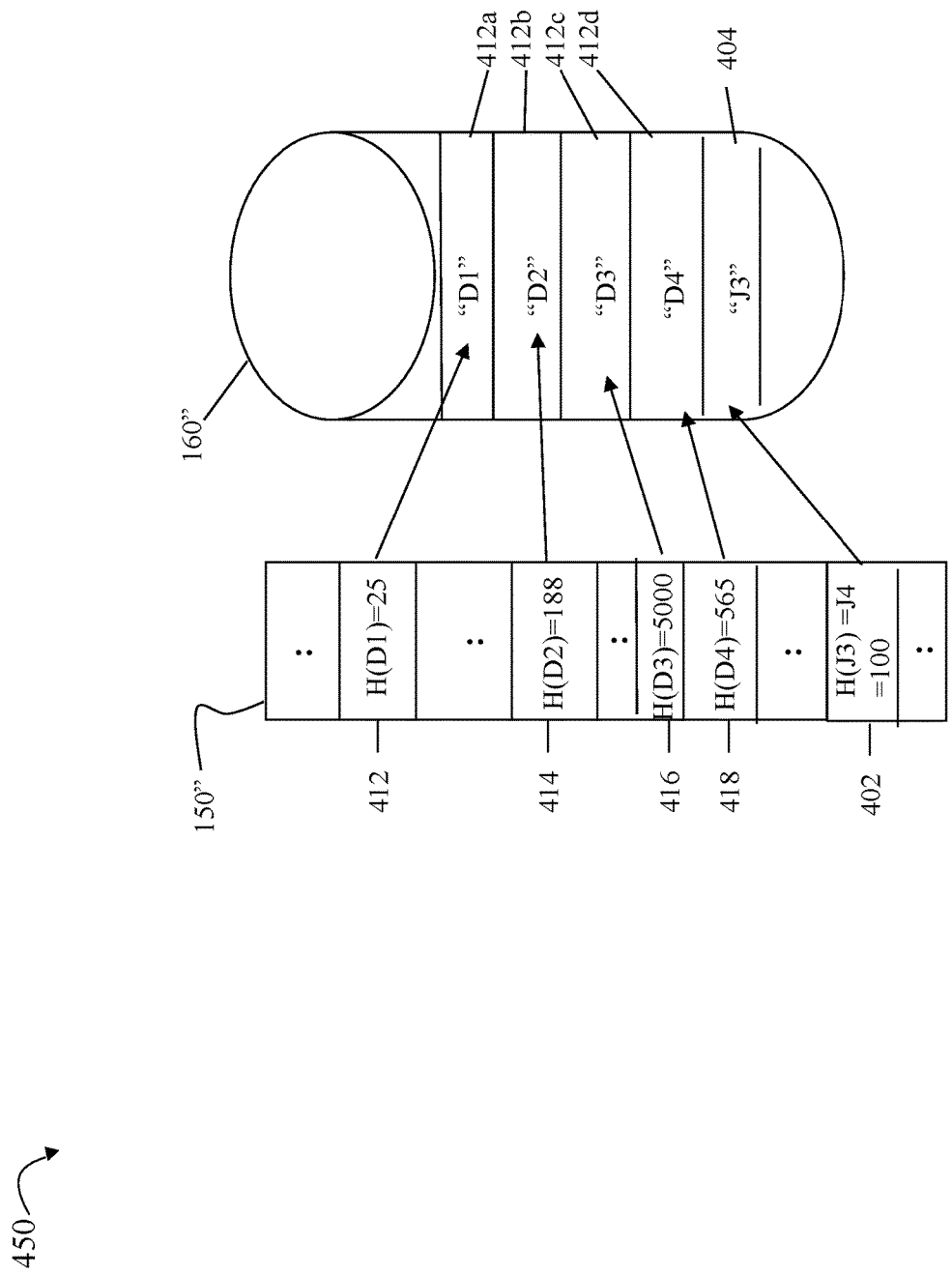

Assume in this example just described (with the data portion J3 having the data deduplication digest or hash value J4) that processing determines that there is no existing non-null/non-empty entry for the data deduplication hash value or digest J4=100 (e.g., the entry in table 150 for J4=100 is null/empty). Accordingly, with reference now to the example 450 of FIG. 6B, the table 150" may be updated to include a newly added non-null/non-empty entry 402 for the data deduplication hash value J4=100. Further, the data portion J3 404 may be stored in the database 160 and the table entry 402 may be mapped to (e.g., references) the stored data portion J3 404.

Figure 7:
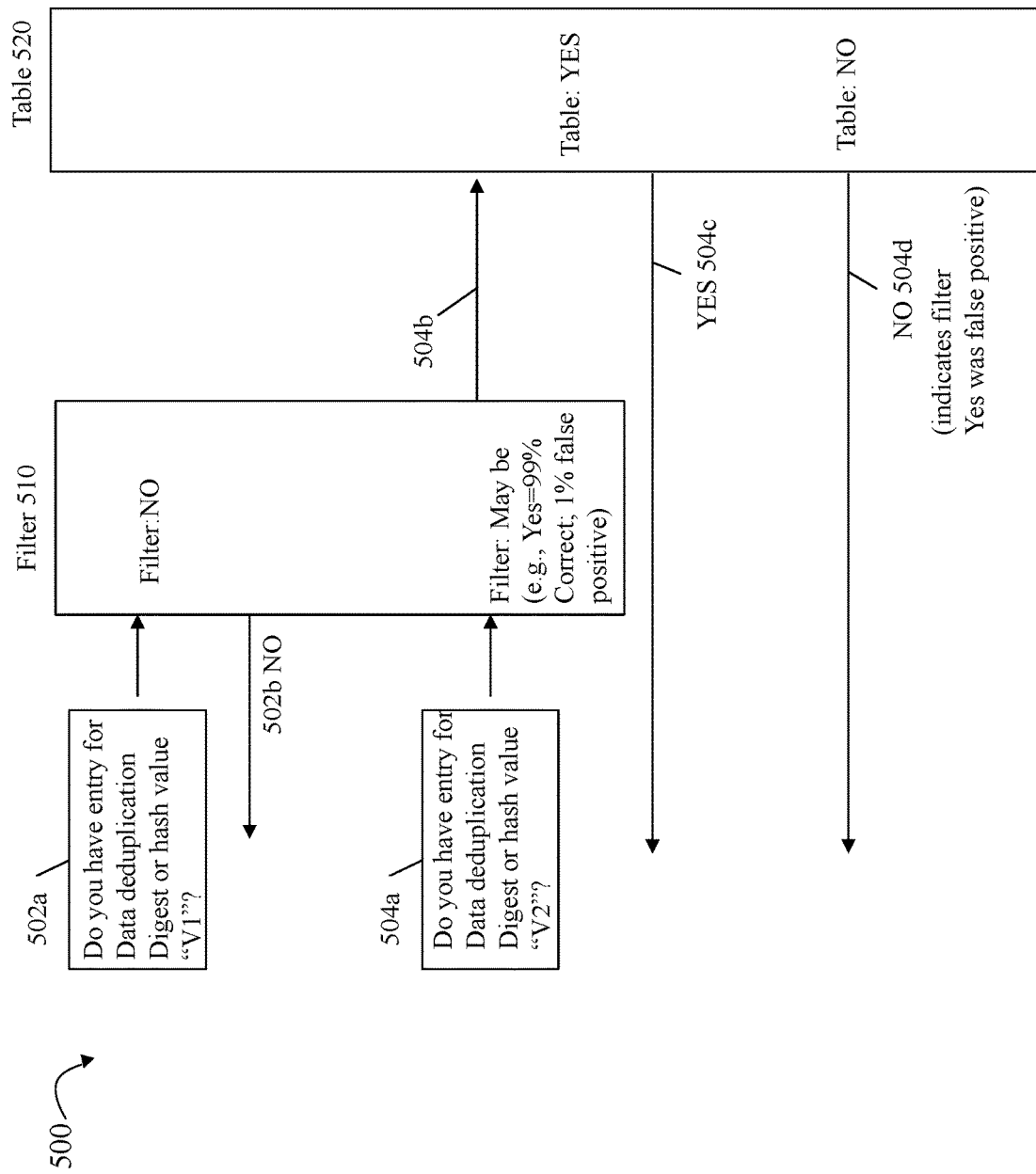

Referring to FIG. 7, shown is an example 500 illustrating processing flow using a Bloom filter in connection with the techniques herein. The example 500 includes the filter 510 denoting the Bloom filter bit vector and the table 520 denoting the table of entries. The element 520 represents, for example, the table 150 or 150" (e.g., as in FIGS. 3, 6A and 6B). The element 510 may represent the Bloom filter such as described elsewhere herein (e.g., in connection with FIGS. 4 and 5). The element 502a may denote a query made of the filter 510 regarding whether the filter 510 indicates the table 520 has an entry (e.g., non-null/non-empty entry) for the data deduplication digest or hash value "V1". As described herein, the filter 510 may definitively determine the table 520 does not include an entry for "V1" (e.g., does not include a non-empty/non-null entry for "V1") by examining bit values generated by the Bloom filter hash functions when provided V1 as an input, where such bit values include at least one bit value=0. If the filter 510 determines definitively that the table 520 does not include an entry for "V1" (e.g., does not include a non-empty/non-null entry for "V1"), the filter 510 may return a value of no 502b.

The element 504a may denote a query made of the filter 510 regarding whether the filter 510 indicates the table 520 has an entry for the data deduplication digest or hash value "V2". As described herein, in response to the query 504a as to whether the table 520 includes an entry for "V2" (e.g., includes a non-empty/non-null entry for "V2"), the filter 510 may determine that the table 520 "May" include an entry for V2 (e.g., may include a non-empty/non-null entry for "V2"). If the filter 510 determines that the table 520 "may" include an entry for "V2" (e.g., "may" include a non-empty/non-null entry for "V2"), the query may be further issued 504b with respect to the table 520 directly. In response to 504b, a look-up or search of the table 520 may be performed directly to determine definitively whether the table 520 includes an entry for "V2" (e.g., includes a non-empty/non-null entry for "V2"). If query 504b determines that the table 520 includes an entry for "V2" (e.g., includes a non-empty/non-null entry for "V2"), a response 504c of yes may be returned. Otherwise, if query 504b determines that the table 520 does not include an entry for "V2" (e.g., includes a null/empty entry for "V2"), a response 504d of no may be returned.

Consistent with discussion elsewhere herein, processing may be performed in response to receiving a no as indicated by 502b and 504d. In response to receiving no 502b for the deduplication digest or hash value V1 for a first corresponding original data portion, the processing may include storing the first corresponding original data portion in the database 160, adding the deduplication hash value or digest to the table 520 for V1 (e.g., adding a non-empty/non-null entry in table 520 for V1 which maps or references the first corresponding original data portion as stored in the database 160), and returning an acknowledgement to the host or other client that issued the write operation writing the first corresponding original data portion. In response to receiving no 504d for the deduplication digest or hash value V2 for a second corresponding original data portion, the processing may include storing the second corresponding original data portion in the database 160, adding the deduplication hash value or digest to the table 520 for V2 (e.g., adding a non-empty/non-null entry in table 520 for V2 which maps or references the second corresponding original data portion as stored in the database 160), and returning an acknowledgement to the host or other client that issued the write operation writing the second corresponding original data portion. In response to receiving a yes as indicated by 504c, an acknowledgement may be sent to the host or another client that issued the write operation writing the second corresponding original data portion having deduplication digest V2. Additionally, in response to receiving yes 504c, the copy of the second corresponding original data portion as included in host write operation may be discarded (e.g., since there is already a copy of the second corresponding original data portion stored in the database 160).

Figure 8:
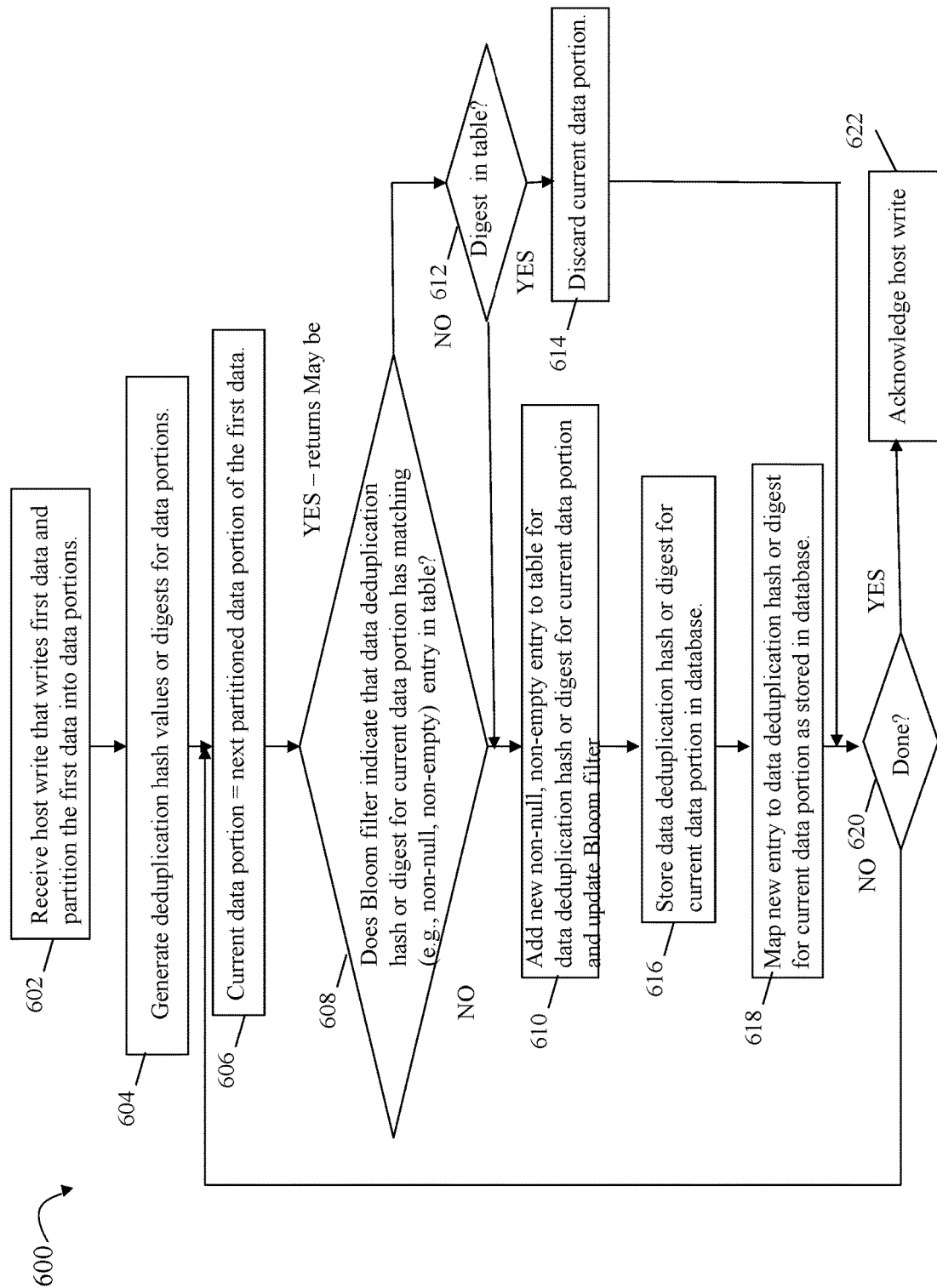
FIG. 8 is a flowchart of processing steps that may be performed in an embodiment in accordance with the techniques herein.

Referring to FIG. 8, shown is a flowchart 600 of processing steps that may be performed in an embodiment in accordance with the techniques herein. The flowchart 600 summarizes processing as described above in connection with processing a host write operation in at least one embodiment in accordance with the techniques herein. At the step 602, the data storage system receives a host write that writes first data and the first data is partitioned into one or more data portions, such as illustrated by 102 in FIG. 3.

From the step 602, the processing proceeds to the step 604 where deduplication hash values or digests are generated for the one or more data portions. The step 604 is illustrated and described, for example, with reference to the element 104 of FIG. 3. At the step 606, the current data portion is assigned the next partitioned data portion of the data, where the current data portion processing will now begin. From the step 606, the processing proceeds to the step 608 where a determination is made as to whether the Bloom filter indicates that the data deduplication hash or digest for the current data portion has a matching (e.g., non-null, non-empty) entry in the table. The step 608 processing is described, for example, in connection with FIGS. 5, 6A, 6B and 7.

If the step 608 evaluates to yes, which is an indefinite probable yes or maybe, control proceeds to the step 612. At the step 612, the table of the data deduplication hash values or digests is directly searched to determine whether the data deduplication hash or digest for the current data portion has a matching (e.g., non-null, non-empty) entry in the table. If the step 612 evaluates to yes, control proceeds to the step 614 where the current data portion may be discarded and control proceeds to the step 620. If the step 612 evaluates to no, it means that the yes returned in step 608 was a false positive and control proceeds to the step 610.

If the step 608 evaluates to no, control proceeds to the step 610. At the step 610, a new non-null, non-empty entry to table for the data deduplication hash or digest for current data portion is added to the table. The step 610 also includes updating the Bloom filter with additional appropriate bits set based on the Bloom filter hash algorithm or function outputs (e.g., the hash values) generated for the data deduplication hash or digest for current data portion. From the step 610, control proceeds to the step 616 to store the data deduplication hash or digest for the current data portion in the database of data portions (e.g., 160, 160"). From the step 616, control proceeds to the step 618 to map the new entry (added in the step 610) to the data deduplication hash or digest for the current data portion (as stored in the database in the step 616). From the step 618 control proceeds to the step 620 where a determination is made as to whether all data portions of the first data of the host write operation have been processed. If step the 620 evaluates to no, control proceeds to the step 606 to process the next data portion. If step the 620 evaluates to yes, control proceeds to the step 622 where processing is performed to acknowledge completion of the host write (as received in the step 602).

At least one embodiment in accordance with the techniques herein may have the GPU cores of the GPU domain perform simultaneous data deduplication digest or hash value generation by executing the same instruction stream of a hashing algorithm code in parallel where each execution instance of the instruction stream computes a different data deduplication digest or hash value for a different original data portion. For example, consider an embodiment using a GPU device that has 256 cores and can therefore process as many as 256 different sets of input data. In this case, processing may be performed to simultaneously calculate 256 data deduplication hash values for 256 different original data portions (e.g., simultaneously calculate 256 digest or hash values of 104 of FIG. 3 for 256 corresponding input data portions of 102 of FIG. 3). As noted above, an embodiment in accordance with the techniques herein may also partition other processing tasks for execution in the GPU domain rather than the CPU domain.

Figure 9:
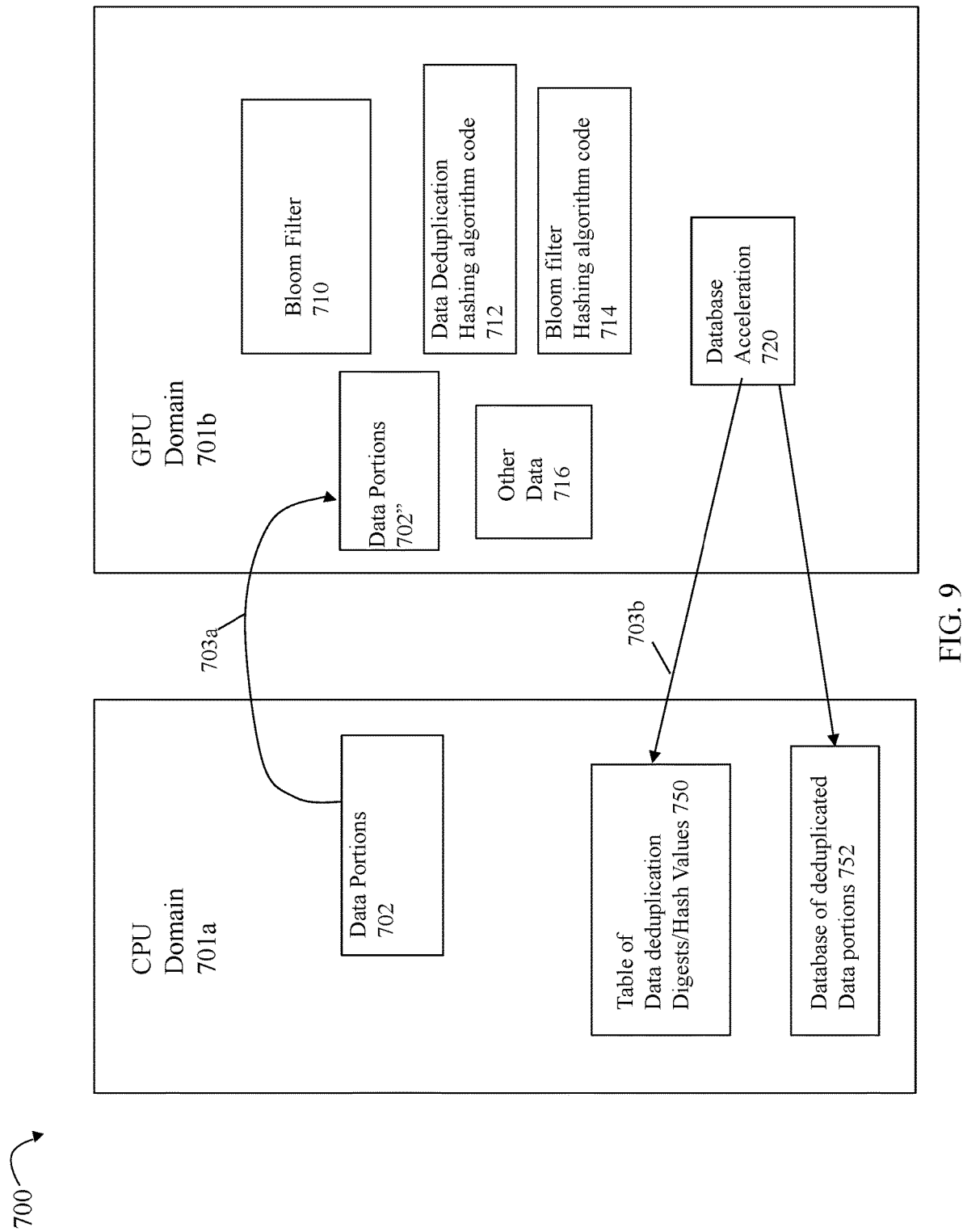

Referring to FIG. 9, shown is an example of components and data that may be included in the CPU and the GPU domains in at least one embodiment in accordance with the techniques herein. The example 700 includes the CPU domain 701a including one or more CPUs or main processors and the GPU domain 701b including one or more GPUs or GPU devices. The example 900 indicates that the data portions 702, the table of data deduplication digest or hash values 750 and the database of deduplicated data portions 752 may be stored in the CPU domain. In particular, data of 702, 750 and 752 may be stored in a memory of the CPU domain 701a. The example 900 indicates that the data portions 702", the other data 716, the Bloom filter 710, the data deduplication hashing algorithm code 712, the Bloom filter hashing algorithm code 714 and the database acceleration module/code 720 may be in the GPU domain 701b. The other data 716 may generally denote other data inputs and outputs used by various executing code modules in the GPU, such as the code of modules 712 and 714. The arrow 703a indicates that the partitioned data portions 702 (e.g., 102 of FIG. 3) may be copied from a memory of the CPU domain 701a to a memory of the GPU domain 701b for processing. The code of 712 executes in the GPU domain and accesses the data portions 702" for input in connection with generating the data deduplication hash values or digests (represented as being included in the other data 716). The code of 714 executes in the GPU domain and accesses the data deduplication hash values or digests of 716 for input in connection with generating the Bloom filter hash values (represented as being included in the other data 716). In at least one embodiment in accordance with the techniques herein, the code of 712 may include a single instruction stream executed in parallel on a number of GPU cores where each such parallel execution instance calculates a different data deduplication digest for a different one of the data portions 702". The element 710 may denote that the Bloom filter data structure is stored in a GPU memory and also that code executed to maintain/update the Bloom filter bit values executes on GPU processors. The element 720 denotes the code executed to access (e.g., read and write) the table of data deduplication digests or hash values 750 (as stored in the CPU domain 701a) and also access the database of deduplicated data portions 752. In at least one embodiment, access operations (e.g., read, write, query) accessing the table 750 and/or the database 752 may be journaled by the code of 720. For example, operations to access the table 750 may be received and stored as entries in a journal stored in a memory of the GPU domain 701b. At some point later, the database acceleration module 720 may process the access operations or commands stored in the journal such as part of background processing. The code of module 720 may also perform any desired suitable optimization on the journaled data. For example, the module 720 may merge or combine multiple write operations as may be appropriate to maintain data integrity such as, for example, in connection maintaining write order consistency (e.g., apply writes in time sequential order). For write operations which modify the table 750 and/or the database 752, the write operation may be considered complete once a record for the write operation has been stored in the journal. As known in the art, any suitable technique may be used to ensure that journaled entries are persistently stored such as in the event of a power failure.

The particular partitioning of tasks and storage among the domains 701a and 701b as illustrated in the FIG. 9 is an example of what may be implemented in at least one embodiment. An embodiment may generally configure and implement any other suitable partitioning. Additionally, an embodiment may also store additional data and execute other code in the domains 701a and 701b other than as illustrated in the FIG. 9.

An embodiment may implement the techniques herein using code executed by a processor. For example, an embodiment may implement the techniques herein using code which is executed by the one or more CPUs and the one or more GPUs of the data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data deduplication in a system comprising:
    receiving one or more write operations that write first data;
    partitioning the first data into a plurality of data portions;
    generating, using a first hash function, a plurality of data deduplication hash values for the plurality of data portions, wherein a first data portion is included in the plurality of data portions and a first data deduplication hash value of the plurality of data deduplication hash values is produced by said generating for the first data portion, wherein each of the plurality of data deduplication hash values generated using the first hash function uniquely represents a corresponding one of the plurality of data portions;
    performing first processing using a Bloom filter to determine whether the first data deduplication hash value has a corresponding first entry in a data store of deduplication hash values; and
    responsive to the first processing determining the first data deduplication hash value does not have the corresponding first entry in the data store of deduplication hash values, performing second processing, said second processing including adding the corresponding first entry in the data store of deduplication hash values, and wherein the system comprises a central processing unit (CPU) domain and a GPU (graphics processing unit) domain, wherein the CPU domain includes one or more main processors and wherein the GPU domain includes a first device comprising a plurality of processors, wherein at least said generating is performed in the GPU domain to offload processing from the CPU domain, and wherein said generating includes the plurality of processors of the first device of the GPU domain executing a same first instruction stream in parallel, wherein the same first instruction stream includes code of the first hash function and each of the plurality of processors of the first device receives as input a different one of the plurality of data portions and generates a different one of the plurality of data deduplication hash values that corresponds to said different one of the plurality of data portions.

2. The method of claim 1, wherein the first processing further includes:
determining, in accordance with Bloom filter hash functions and the first data deduplication hash value, a first set of bit positions of the Bloom filter, wherein each bit position in the first set identifies a bit position in the Bloom filter;
querying the Bloom filter to determine whether any bit position of the first set has a corresponding bit position in the Bloom filter that is set to zero; and
responsive to determining that at least one bit position of the first set has a corresponding bit position in the Bloom filter that is set to zero, determining that the first data deduplication hash value does not have the corresponding first entry in the data store of data deduplication hash values.

3. The method of claim 2, further comprising:
responsive to determining that no bit position of the first set has a corresponding bit position in the Bloom filter that is set to zero, determining that the first data deduplication hash value may have the corresponding first entry in the data store of data deduplication hash values and performing additional processing to definitely determine whether the first data deduplication hash value has the corresponding first entry in the data store of data deduplication hash values.

4. The method of claim 3, wherein said additional processing includes:
querying the data store of data deduplication hash values to determine whether the first data deduplication hash value has the corresponding first entry in the data store of data deduplication hash values.

5. The method of claim 4, further comprising:
responsive to said querying the data store of data deduplication hash values determining the first data deduplication hash value has the corresponding first entry in the data store of data deduplication hash values, discarding the first data portion and determining that the first data portion is already stored in a data store of deduplicated data portions.

6. The method of claim 4, further comprising:
responsive to said querying the data store of data deduplication hash values determining the first data deduplication hash value does not have the corresponding first entry in the data store of data deduplication hash values, performing other processing including:
adding the corresponding first entry in the data store of deduplication hash values;
storing the first data portion in the data store of deduplication data portions; and
mapping the corresponding first entry to the first data portion as stored in the data store of deduplication data portions.

7. The method of claim 6, wherein the other processing includes updating the Bloom filter in accordance with the first set of bit positions, wherein each bit position in the first set identifies a bit position in the Bloom filter which is set to one by said updating.

8. The method of claim 1, wherein the Bloom filter is a probabilistic data structure that provides a definitive indication of particular data deduplication hash values that do not have corresponding entries in the data store of data deduplication hash values, and provides an indefinite indication of particular data deduplication hash values that have corresponding entries in the data store of data deduplication hash values.

9. The method of claim 8, wherein the indefinite indication is a probabilistic indication as to whether particular data deduplication hash values have corresponding entries in the data store of data deduplication hash values.

10. The method of claim 1, wherein the second processing includes storing the first data portion in a data store of deduplicated data portions and updating the Bloom filter in accordance with the first data portion.

11. The method of claim 10, wherein the data store of deduplication data portions includes only a single unique instance of each data portion processed in connection with data deduplication.

12. The method of claim 1, wherein said first processing is performed in the GPU domain and includes executing second code, by one or more processors of the GPU domain, that uses the Bloom filter to determine whether the first data deduplication hash value has a corresponding first entry in a data store of deduplication hash values.

13. The method of claim 12, further comprising:
journaling write operations that add new entries to the data store of deduplication hash values.

14. A system comprising:
one or more processors; and
a memory comprising code stored thereon that, when executed, performs method of performing data deduplication comprising:
receiving one or more write operations that write first data;
partitioning the first data into a plurality of data portions;
generating, using a first hash function, a plurality of data deduplication hash values for the plurality of data portions, wherein a first data portion is included in the plurality of data portions and a first data deduplication hash value of the plurality of data deduplication hash values is produced by said generating for the first data portion, wherein each of the plurality of data deduplication hash values generated using the first hash function uniquely represents a corresponding one of the plurality of data portions;
performing first processing using a Bloom filter to determine whether the first data deduplication hash value has a corresponding first entry in a data store of deduplication hash values; and
responsive to the first processing determining the first data deduplication hash value does not have the corresponding first entry in the data store of deduplication hash values, performing second processing, said second processing including adding the corresponding first entry in the data store of deduplication hash values, and wherein the system comprises a central processing unit (CPU) domain and a GPU (graphics processing unit) domain, wherein the CPU domain includes one or more main processors and wherein the GPU domain includes a first device comprising a plurality of processors, wherein at least said generating is performed in the GPU domain to offload processing from the CPU domain, and wherein said generating includes the plurality of processors of the first device of the GPU domain executing a same first instruction stream in parallel, wherein the same first instruction stream includes code of the first hash function and each of the plurality of processors of the first device receives as input a different one of the plurality of data portions and generates a different one of the plurality of data deduplication hash values that corresponds to said different one of the plurality of data portions.

15. A non-transitory computer readable medium comprising code stored thereon that, when executed, performs a method of performing data deduplication in a system comprising:
   receiving one or more write operations that write first data;
   partitioning the first data into a plurality of data portions;
   generating, using a first hash function, a plurality of data deduplication hash values for the plurality of data portions, wherein a first data portion is included in the plurality of data portions and a first data deduplication hash value of the plurality of data deduplication hash values is produced by said generating for the first data portion, wherein each of the plurality of data deduplication hash values generated using the first hash function uniquely represents a corresponding one of the plurality of data portions;
   performing first processing using a Bloom filter to determine whether the first data deduplication hash value has a corresponding first entry in a data store of deduplication hash values; and
   responsive to the first processing determining the first data deduplication hash value does not have the corresponding first entry in the data store of deduplication hash values, performing second processing, said second processing including adding the corresponding first entry in the data store of deduplication hash values, and wherein the system comprises a central processing unit (CPU) domain and a GPU (graphics processing unit) domain, wherein the CPU domain includes one or more main processors and wherein the GPU domain includes a first device comprising a plurality of processors, wherein at least said generating is performed in the GPU domain to offload processing from the CPU domain, and wherein said generating includes the plurality of processors of the first device of the GPU domain executing a same first instruction stream in parallel, wherein the same first instruction stream includes code of the first hash function and each of the plurality of processors of the first device receives as input a different one of the plurality of data portions and generates a different one of the plurality of data deduplication hash values that corresponds to said different one of the plurality of data portions.

16. The non-transitory computer readable medium of claim 15, wherein the first processing further includes:
   determining, in accordance with Bloom filter hash functions and the first data deduplication hash value, a first set of bit positions of the Bloom filter, wherein each bit position in the first set identifies a bit position in the Bloom filter;
   querying the Bloom filter to determine whether any bit position of the first set has a corresponding bit position in the Bloom filter that is set to zero; and
   responsive to determining that at least one bit position of the first set has a corresponding bit position in the Bloom filter that is set to zero, determining that the first data deduplication hash value does not have the corresponding first entry in the data store of data deduplication hash values.

17. The non-transitory computer readable medium of claim 16, wherein the method further comprises:
   responsive to determining that no bit position of the first set has a corresponding bit position in the Bloom filter that is set to zero, determining that the first data deduplication hash value may have the corresponding first entry in the data store of data deduplication hash values and performing additional processing to definitely determine whether the first data deduplication hash value has the corresponding first entry in the data store of data deduplication hash values.

18. The non-transitory computer readable medium of claim 17, wherein said additional processing includes:
   querying the data store of data deduplication hash values to determine whether the first data deduplication hash value has the corresponding first entry in the data store of data deduplication hash values.

* * * * *